Nov. 14, 1967 W. A. FOLSOM 3,353,164

COMPARISON READ-OUT CIRCUIT

Filed June 10, 1963 2 Sheets-Sheet 1

INVENTOR.
WILLIAM A. FOLSOM
BY
Davis, Hoxie, Faithfull & Hapgood
ATTORNEYS.

INVENTOR.
WILLIAM A. FOLSOM
BY
Davis, Hoxie, Faithfull & Hapgood
ATTORNEYS.

3,353,164
Patented Nov. 14, 1967

3,353,164

COMPARISON READ-OUT CIRCUIT

William A. Folsom, 303 11th St.,
Schenectady, N.Y. 12306

Filed June 10, 1963, Ser. No. 286,829
2 Claims. (Cl. 340—173)

ABSTRACT OF THE DISCLOSURE

A printed code on paper is translated into electrical signals by a read-out device. The code is in the form of darkened or magnetically active areas. The circuit for the read-out device includes a pick-up head which converts the code into an electrical signal and a bridge including a rate responsive leg. The circuit also includes, in series with the bridge, a time-delay circuit to avoid mistaking small stray particles for code.

The present invention relates to the apparatus for translating of intelligence and more particularly to circuits for translating optical or magnetic impressions into electrical signals.

The rise in the number of documents to be stored, compiled and transmitted has led to various printed codes which are read by machine, such as coded account numbers on checks. U.S. Patent 2,897,267, of D. C. Prince, illustrates a visible machine-readable code typed along with alphabetical letters, so that each letter has a code. Generally, circuits to read, i.e. translate, such codes into electrical signals are complex and impose limitations on the printing of the code. Often the limitations on the printing of the code are so stringent that special and expensive machines are required to print the code so that its dimensions are exact and its magnetic density uniform, and, once printed, the code cannot be corrected.

It is the objective of the present invention to provide a circuit for optical or magnetic reading of printed code, which circuit is relatively simple and reliable and which compensates for printing slop, i.e. the darkening of the area beyond the code bit or the uneven density of printing ink, so that the code may be printed on an ordinary typewriter.

In accordance with the present invention, a code is printed onto a document. A pick-up head converts the code bits into electrical pulses. The pulses are fed to the following equipment connected in series: an amplifier a special bridge circuit, another amplifier, a delay circuit and a relay. In the use of a pick-up head using alternating current, A.C. pulses as a carrier are fed from an oscillator to the pick-up head, said pick-up head also reacting to the bits on the tape, and a demodulator is used after the first amplifier. The special bridge compares the trailing edge of the pulse with the leading edge of the sample pulse and is therefore comparatively not very sensitive to steady state noise or to variations in pulse height. The delay circuit prevents operation by short pulses, i.e. having a short time base. These short pulses are caused by stray dirt or magnetic material or by stray pulses from the power supply. Erasures are a cause of stray magnetic particles, since any erasure causes small particles to remain on the paper near the correction, either in the form of a smear or as individual particles. Since the circuit is insensitive to short pulses from the erasure, the code may be erased and corrections made. The delay circuit is also insensitive to small voids in the code printing.

Other objectives of the present invention will be apparent from the following detailed description taken in conjunction with the accompanying drawings in which.

Figures 1, 2, 3, 4:
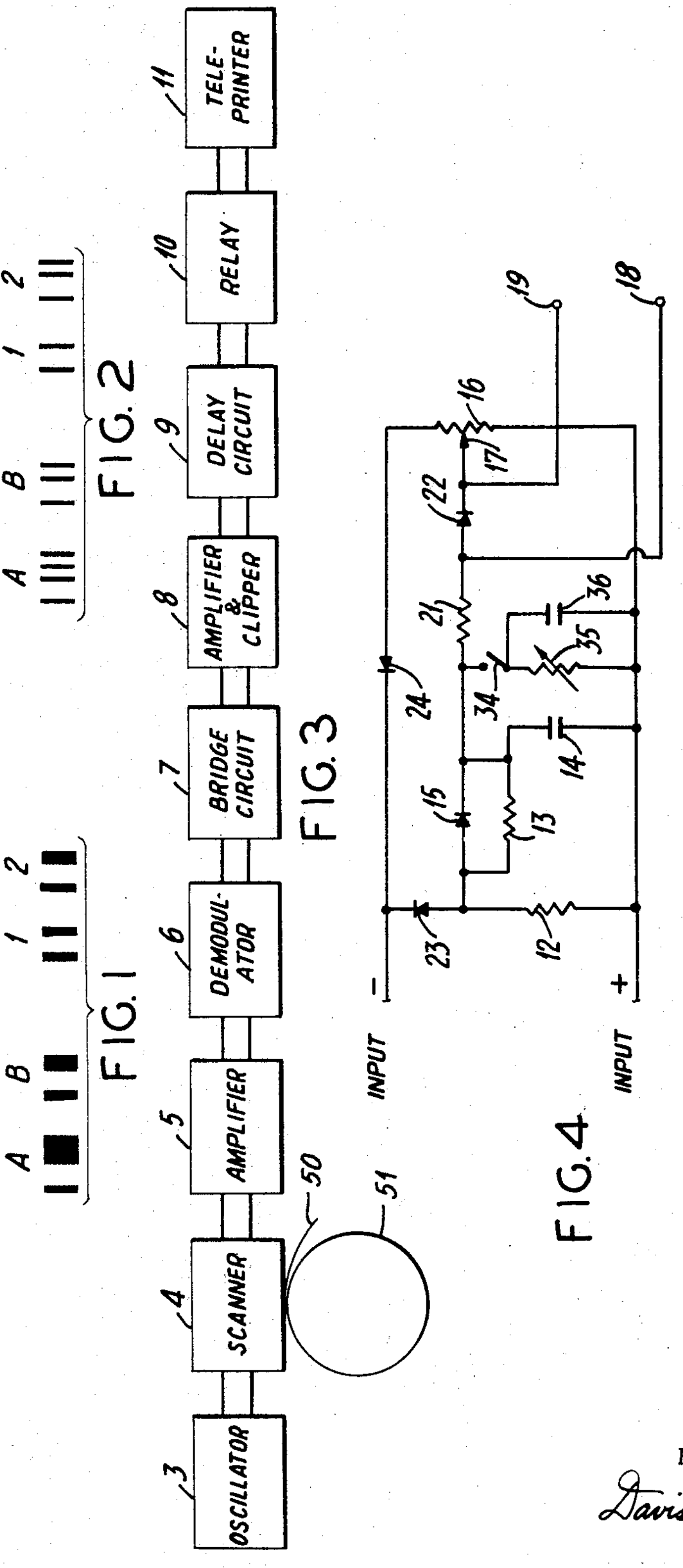
FIGS. 1 and 2 are examples of the type of code printing scanned by the present invention.
FIG. 3 is a block diagram of the first embodiment adapted to translate magnetic code.
FIG. 4 is a circuit diagram of the bridge circuit of FIG. 3.
Figure 5:
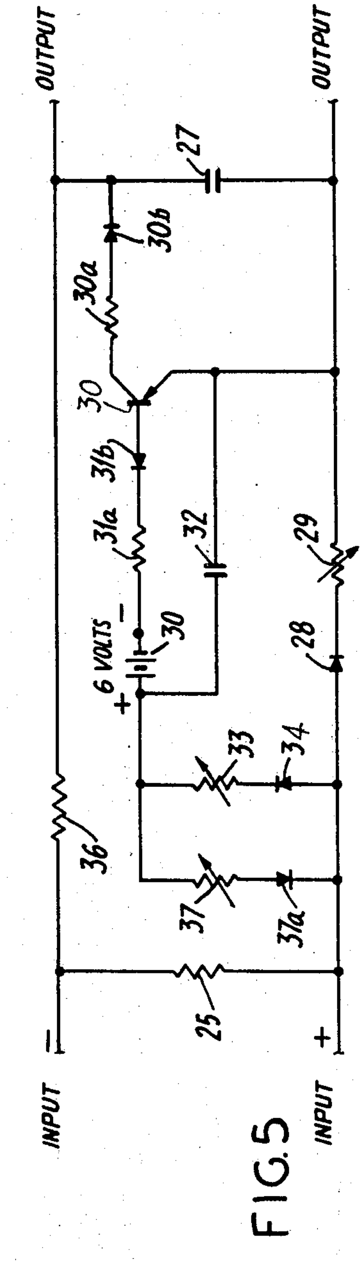
FIG. 5 is a circuit diagram of the delay circuit of FIG. 3.

The machine-readable code 1, shown in FIGS. 1 and 2, consists of vertical lines separated by spacings. Above the code, which represents an alphabetical letter, the letter itself is printed. In this way the message may be read by humans and also by machine.

The printed code 1 is preferably the code known as "Teletype code" and used by the Teletype Company of Chicago, in which each alphabetical character is a combination of bits and spaces of six consecutive bit duration. In the code shown in FIG. 1, each letter, for example "A," has associated with it a predetermined number of vertically printed areas, each the same length and height, and unprinted spaces of predetermined width between the printed areas. The code shown in FIG. 1 is used with magnetic or non-retentive material and with A.C. magnetization at the pick-up head or with an optical pick-up head. The type of code printing shown in FIG. 2 is used with D.C. magnetized retentive or non-retentive material and a pick-up head producing electrical pulses. Other codes than teletype and other forms of printing the codes may be used with the circuits of the present invention.

The code, printed or typed on a web, such as a paper, is moved relative to the scanner. For example, the paper 50 is placed on a drum 51 and the drum is revolved so that the type moves past the scanner. Two embodiment of the invention will be described; the first uses magnetic material in printing and reads the bits electrically and the second uses visible bits and reads them optically.

The first system comprises the following subcircuits arranged in series: an oscillator 3 preferably operating at 300 cycles per minute or 1½ cycles per bit length or an A.C. generator whose frequency output is proportional to the movement of the paper; a scanner 4 having a magnetic recording head and a pick-up head; a conventional amplifier 5 which amplifies both the pulse from the code and the modulation carrier; a demodulator 6, of conventional design, to eliminate the carrier wave; a bridge circuit 7; a direct current amplifier and clipper 8; a delay circuit 9; a relay 10; and a teleprinter 11 as the "read-out" machine. Other types of final machines, such as a computer, card punch machine, a billing machine or a numerically controlled machine tool, may be used in place of the teleprinter 11.

The oscillator 3, which preferably operates at 1½ cycles per bit length, should not be operated at a higher frequency directly to reduce "drop-outs," i.e., loss of signal, when the head leaves the tape, and not lower to avoid magnetic fields in spaces between the bits. Preferably the selected frequency is an integral number of half-cycles for each bit so that the pulse rise time is uniform.

The amplifier 5 is the conventional type of tube amplifier, preferably a multi-stage magnetic recorder amplifier using feed-back to attenuate high frequencies. Preferably a capacitance is placed in the feed-back path to the plate of the amplifying tube in order to further attenuate high frequencies caused by stray magnetic particles. Circuit values for amplifier 5 are not given, as well-known circuits may be used.

The bridge circuit 7 includes an RC circuit consisting of a resistor 12 in series with a resistor 13, and the resistors in parallel with condenser 14. The resistor 12 and condenser 14 are connected to the output connections of demodulator 6. The RC circuit's charge time equals $R_{13} \times C_{14}$ and its discharge time constant equals $$(C_{14}+C_{36})\left(\frac{R_{35}\times R_{12}}{R_{35}+R_{12}}\right)$$

A diode 15 bypasses resistor 13 so that capacitor 14 bypasses resistor 13 on discharge. Diode 24 also supplies a pulsating D.C. voltage, equal to the bridge's input voltage, to one side of an adjustable resistor 16. The arm 17 of resistor 16 acts as a voltage divider and is set so that the bridge's first output point 18 is positive compared to the bridge's other output point 19. Resistor 21 acts to limit the current to the subsequent amplifier 8 and diode 22 protects amplifier 8 from overloading. A blocking diode 23 prevents negative voltage from discharging through resistor 16 from resistor 12. Diode 24 balances the bridge circuit at low input signal voltages, when the resistance of $D_{23}$ and $D_{24}$ is appreciable.

The bridge circuit 7 may be analyzed as having two legs which are electrically balanced against each other. The first leg consists of resistors 12 and 13 and condenser 14. This leg initially acts as a rate circuit. The other leg is adjustable resistor 16. The second leg biases the amplifier to cut off by steady state noise or by biasing point 18 positive with respect to point 19. $R_{16}$ works as a fixed bias in the presence of steady state noise (ripple, etc.) by charging $C_{14}$ up so that point 18 is positive with respect to point 19. Any other type of fixed bias may be used in place of resistor 16. If the pulse's rate of voltage increase is sufficient to overcome the bias of resistor 16, the rate circuit leg balances out the resistor 16 leg and the amplifier is activated.

Figure 6:
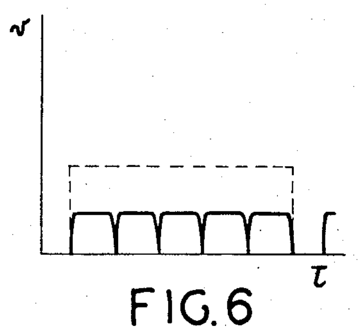
FIGS. 6, 7 and 8 are diagrams of wave pulse shapes at various points in the circuits of FIG. 3.
Figure 7:
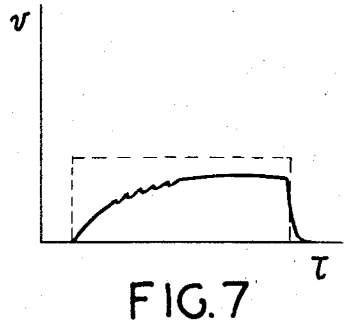
Figure 8:
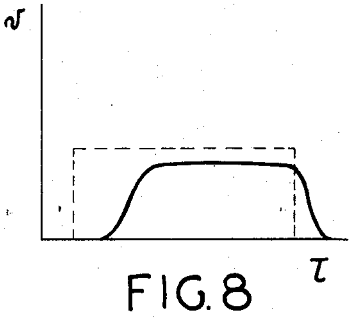

The amplifier 8 is a conventional direct current amplifier and clipper. When activated, it applies D.C. pulses without positive components and having a constant peak amplitude across the input resistor 25 of the delay circuit 9. The wave form applied to resistor 25 is shown in FIG. 6. In FIGS. 6, 7 and 8 the pulses are shown in dark line and the group of pulses representing an alphabetical letter in dotted outline. A suitable device for amplifier 8 is Amplifier Model 540–1 KA, manufactured by Trepac Corporation of America.

The pulses from amplifier 8 travel through delay circuit 9. In delay circuit 9 one output connection from amplifier 8 is connected to one end of resistor 25 and through resistor 36 to one side of condenser 27. The other output is connected to the other end of resistor 25 and through diode 28 and adjustable resistor 29 to the other side of condenser 27. Condenser 27 is normally shorted out through resistor 30*a* and diode 30*b* by the collector current of transistor 30. The transistor's base is biased negative through resistor 31*a* and diode 31*b* by the direct current 6-volt power supply 31. A condenser 32 is connected from the positive side of voltage supply 31 to the emitter of transistor 30. Condenser 32 is chargeable through resistor 33 and diode 34 and is dischargeable through resistor 37 and diode 37*a*.

The delay circuit 9 operates when a signal is applied across resistor 25. This signal builds up a charge on condenser 32 from resistor 29. After a predetermined time delay, the base current to transistor 30 is cut off. The voltage builds up across condenser 27 and this energizes the output relay. At the end of the received signal, pulse condenser 32 discharges, and after a delay the transistor conducts and discharges condenser 27.

The operation of this first system is as follows: A bit is magnetized by the recording head of the scanner 4 with an alternating current from oscillator 3. The bit produces, along with its carrier wave, an A.C. pulse of about 22-millisecond duration in the pick-up head of the scanner 4. This pulse is voltage amplified by amplifier 5. The demodulator 6 produces a full-wave rectified direct current pulse which is fed to bridge circuit 7.

As long as point 18 is positive relative to point 19, the amplifier 8 is not activated. When scanner 4 enters a magnetically printed area, its A.C. voltage output increases and therefore the D.C. voltage output of the demodulator 6 also increases. When the rising pulsating D.C. voltage from the code bit is applied to bridge 7 the voltage divider leg of the bridge immediately follows the voltage rise but the leg having capacitor 14 lags, so that point 19 goes positive relative to point 18 and amplifier 8 is triggered. Activation of amplifier 8 causes the pulse, which is shaped by delay circuit 9, to build up voltage on capacitor 27 and operate relay 10 when a predetermined voltage is attained.

The shaping of the pulse by delay circuit 9 is shown in FIGS. 7 and 8. In FIG. 7 the pulse is shown as it appears taken across condenser 32 and in FIG. 8 as taken across the output of circuit 9, i.e. the input to relay 10. It is seen that the pulse somewhat loses its rectangular shape, which is irrelevant, and is delayed in its leading and trailing edges in the delay circuit. There is more delay at the start of the pulse than at the rear of the pulse, in order to correct for printing overlap.

Operation of relay 10 operates the teleprinter 11 and also closes the relay contacts 34 which are part of the bridge circuit 7.

The closing of contacts 34 connects resistor 35 across condenser 14, keeping point 19 positive relative to point 18. Both legs of the bridge now act as voltage dividers and the bridge circuit is now sensitive to a steady-state signal. There is such a steady-state signal until the end of the printed bit. The steady-state signal charges condensers 36 and 14. When the signal decreases, the condensers 36 and 14 bias the amplifier 8 so that it is deactivated at the end of the bit. Condenser 36 increases the rate at which condenser 14 discharges to its lower voltage level.

The charge on condensers 36 and 14 is proportional to the steady state voltage, so that the amplifier is reverse biased at a fixed percentage of the pulse regardless of the pulse's amplitude and shuts off the amplifier 8 and releases the contacts 34. At the bit's end, the steady state signal terminates and bridge circuit 7 reverts to its original condition, with point 18 positive with respect to point 19 if steady-state noise is present. The bridge circuit is initially rate sensitive so that it operates the amplifier on an increase in voltage. The circuit then becomes voltage sensitive so that the amplifier is maintained in its active state as long as the pulse continues.

The relay 10 is operated in exact time relationship with the code bits on the document. A chart showing preferred circuit values is as follows:

*In bridge A7*

| | |
|---|---|
| Resistor 12 | 560 ohms. |
| Resistor 13 | 1000 ohms. |
| Resistor 35 | 500 ohms. |
| Resistor 21 | 150 ohms. |
| Resistor 16 | 1000 ohms. |
| Diode 15 | 40 PIV germanium. |
| Diode 23 | 40 PIV germanium. |
| Diode 24 | 40 PIV germanium. |
| Diode 22 | 100 PIV silicon. |
| Condenser 14 | 10 mfd. |
| Condenser 36 | 15 mfd. |

*In relay circuit 9*

| | |
|---|---|
| Resistor **25** | 1500 ohms. |
| Resistor **36** | 470 ohms. |
| Resistor **33** | 2500 ohms. |
| Resistor **31a** | 1800 ohms. |
| Resistor **29** | 1000 ohms. |
| Resistor **30a** | 47 ohms. |
| Diode **34** | 40 PIV germanium. |
| Diode **31b** | 40 PIV germanium. |
| Diode **37a** | 40 PIV germanium. |
| Diode **28** | 100 PIV silicon. |
| Diode **30b** | 100 PIV germanium. |
| Condenser **27** | 13 mfd. |
| Condenser **32** | 3.5 mfd. |

The second system, an optical system which views printed bits capable of reflecting light to be detected by a photoelectric device, is similar to the first system in that it feeds pulses derived from bits to the amplifier 5, bridge circuit 7, amplifier 8, delay circuit 9, relay 10 and teleprinter 11. The scanner 4 and oscllator 3 are replaced by the optical arrangement shown in FIG. 9.

Figure 9:
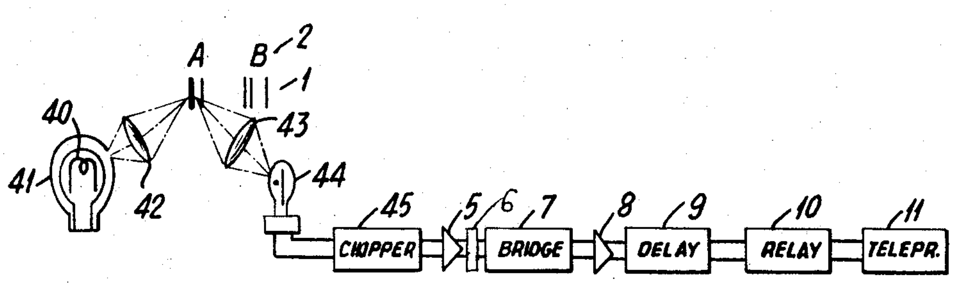
FIG. 9 is a perspective view of an optical scanner which is the second embodiment of the present invention.

In FIG. 9 a beam of light from light bulb 40, shielded by shield 41, passes through condensing lens 42 and is focused on the code 1 of the document being scanned. The light is reflected from the code and gathered and the code's image is magnified by focusing lens 43 and focused on phototube 44. A photodiode may be used instead of the phototube. The electrical signal representing the visible code bits from phototube 44 is made into a A.C. pulses by chopper 45, of conventional design. The chopped pulses are fed to the amplifier 5, a demodulator 6, bridge 7, amplifier 8, delay circuit 9, relay 10 and teleprinter 11, as in the first system.

I claim:

1. A read-out system for the reading of code bits on a web comprising a pick-up transducer head responsive to the presence of the bits which converts their presence into electrical signals, means to move the web relative to the pick-up head, a first amplifier connected to the pick-up head, a bridge circuit connected to the first amplifier and including first and second electrically balanced legs, the first leg being a rate circuit, a second amplifier connected to the bridge circuit and biased to cut-off by the balancing of the legs of the bridge circuit and operated by their unbalancing;

a pulse time delay circuit connected between said second amplifier and a relay connected to said pulse delay circuit.

2. A read-out system as in claim 1 and also including a pulse clipper connected between said bridge circuit and said pulse time delay circuit.

References Cited

UNITED STATES PATENTS

| | | | |
|---|---|---|---|
| 2,835,882 | 5/1958 | Beek et al. | 340—174.1 |
| 2,295,000 | 9/1942 | Morse | 340—173 |
| 2,775,714 | 12/1956 | Curtis | 340—174.1 |
| 2,840,726 | 6/1958 | Hamilton | 340—174.1 |
| 3,164,815 | 1/1965 | Applequist | 340—174.1 |
| 3,217,329 | 11/1965 | Gabor | 340—174.1 |
| 3,295,118 | 12/1966 | Brown | 340—174.1 |

BERNARD KONICK, *Primary Examiner.*

A. BERNARD, V. P. CANNEY, *Assistant Examiners.*